M. M. ROWELL.
CULTIVATOR.

No. 183,868.  Patented Oct. 31, 1876.

WITNESSES:
S. G. King
A. H. Schattenberg

INVENTOR:
Mark M. Rowell
By J. B. Smith
his atty in fact

UNITED STATES PATENT OFFICE.

MARK M. ROWELL, OF OCONOMOWOC, WISCONSIN.

IMPROVEMENT IN CULTIVATORS.

Specification forming part of Letters Patent No. 183,868, dated October 31, 1876; application filed June 22, 1876.

*To all whom it may concern:*

Be it known that I, MARK M. ROWELL, of Oconomowoc, in the county of Waukesha, in the State of Wisconsin, have invented certain Improvements in Slip-Tooth Cultivators, of which the following is a specification:

My invention has for its object cultivating the ground, and is a cultivator arranged so that all the teeth (if one strikes anything hard enough) slip at the same time; and the cultivator is arranged so that it may be changed from a five-toothed cultivator to a horse-hoe and two-toothed cultivator.

Figure 1:
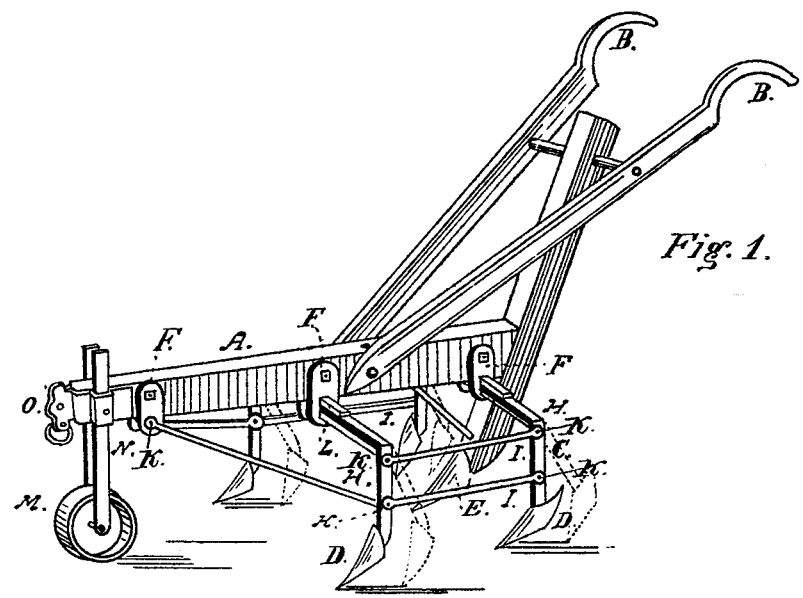
Figure 2:
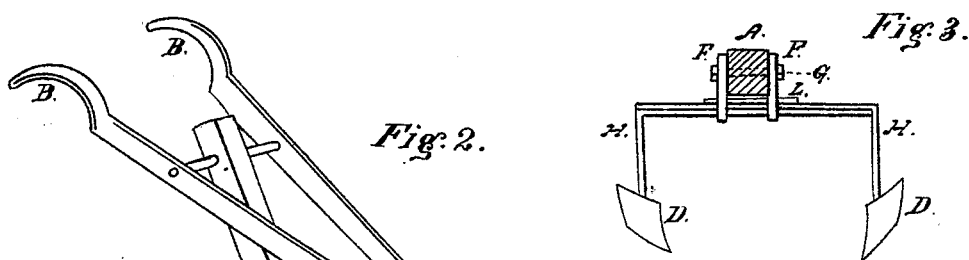
Figure 3:
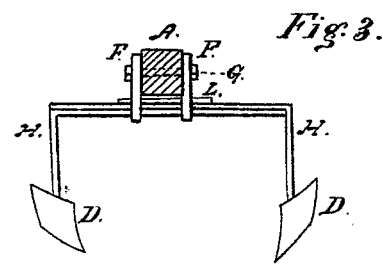

Figure 1 is a perspective view of my invention; Fig. 2, a view of the same changed to a two-toothed cultivator and horse-hoe; and Fig. 3, a view of the ends of the frame which sustain the teeth, and the ears which hold them.

A is the wooden frame of the cultivator; B B, the handles; C, the horse-hoe; D, the teeth; E, the plowshares, and F the ears attached by bolts G to the beam. These ears are held in position against the beam by bolts G, and thus hold the teeth and plowshares in position till the teeth strike something hard enough to pull them back, when the ears swing back, and the teeth and plowshare pass over the obstruction. H H represent standards, to which the teeth are attached, and these beams are secured to the two hindmost ears. F F I I represent rods connecting the standards H together, and connecting the whole to the forward ear F. K K show joints held together by bolts in the ends of the rods I; L, wedges passing through the ears F and on the top of the horizontal part of the standards H, and wedging them together. The standards are made separate, one lapping over the other. M shows a forward wheel, which prevents the cultivator-teeth from running too far into the ground. N shows the rods which hold the same to the cultivator-beam. O shows a clevis-iron, with socket to receive and hold the rods N N, and by which the cultivator is hauled.

This cultivator is operated as follows: The team is hitched to the cultivator, as shown, Fig. 1, and pulled along, pulverizing the ground, and as the teeth pass along, if one strikes a stone or root strong enough to break it, the ears will swing on bolts G, and bring the teeth into the position shown by the dotted lines, and pass on over the obstruction.

Whenever it is desired to use the machine as a hoe, take off the tooth from the middle standard and substitute the hoe instead, and also take off a tooth or plowshare on each side of the cultivator.

I claim as new and as my invention—

A cultivator constructed with frame A, standards H, teeth D, ears F, swinging on bolts G, connected with rods I, all in combination, substantially as described.

MARK M. ROWELL.

Witnesses:
   J. B. SMITH,
   A. SCHATTENBERG.